Nov. 13, 1923.       1,474,103
E. H. BELDEN
STEERING GEAR SUPPORT
Filed June 25, 1920        2 Sheets-Sheet 1
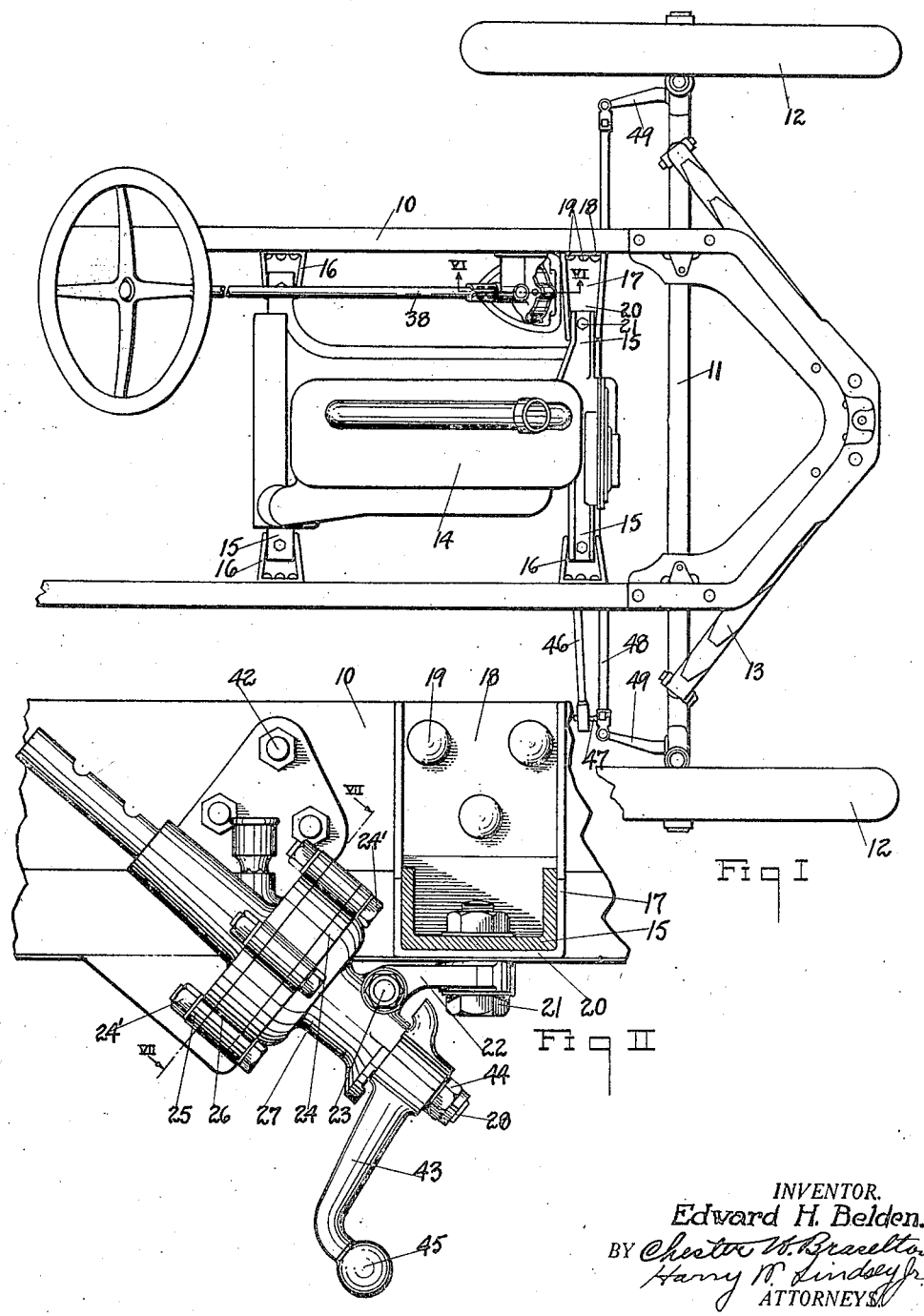
INVENTOR.
Edward H. Belden.
BY
ATTORNEYS

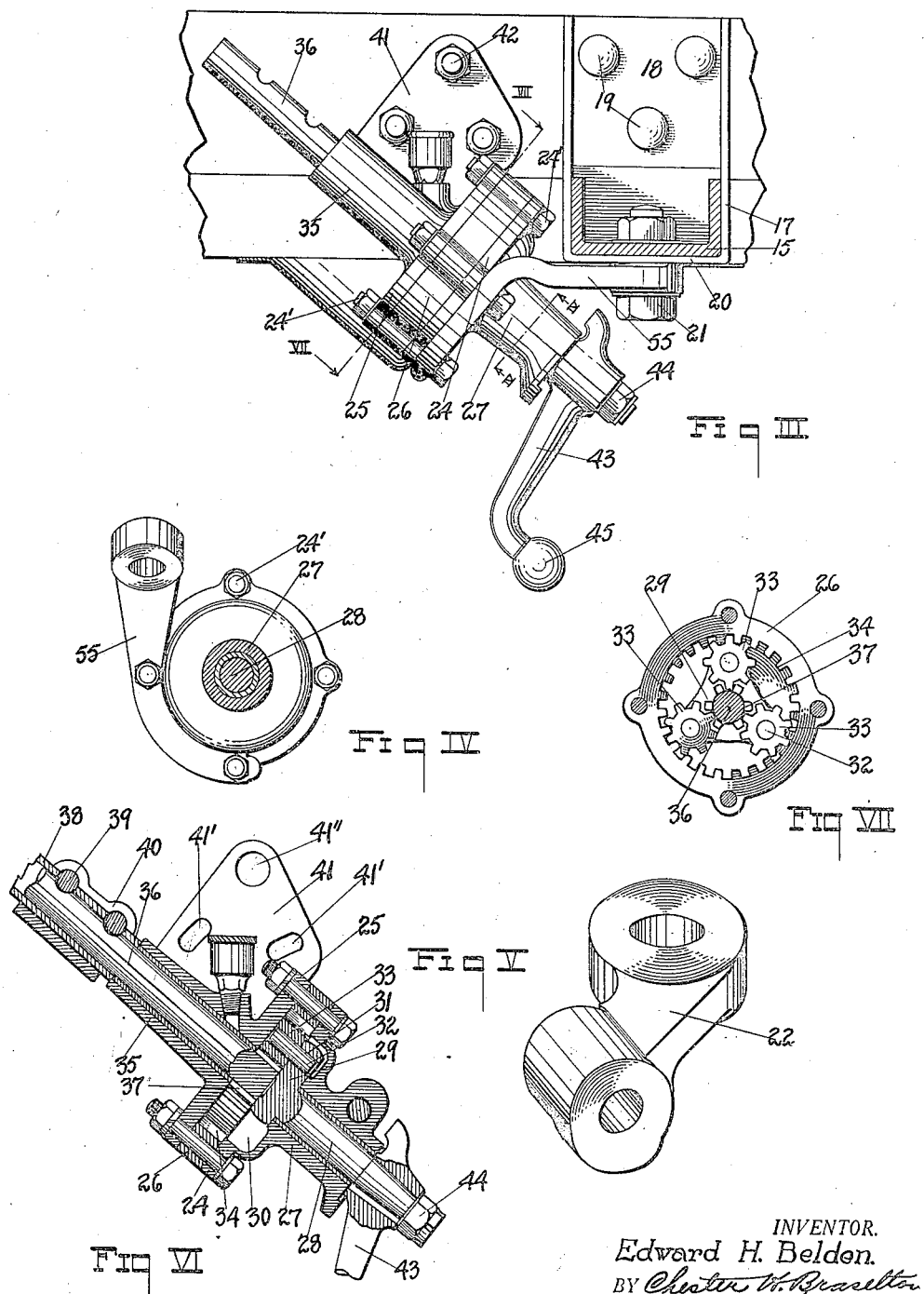

Patented Nov. 13, 1923.

1,474,103

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

STEERING-GEAR SUPPORT.

Application filed June 25, 1920. Serial No. 391,727.

*To all whom it may concern:*

Be it known that I, EDWARD H. BELDEN, residing at Toledo, county of Lucas, State of Ohio, have invented certain new and useful Improvements in Steering-Gear Supports, of which I declare the following to be a full, clear, and exact description.

This invention relates to improvements in steering mechanism for motor vehicles, and particularly to the method of mounting the reduction gearing and steering column to the vehicle.

The principal object of this invention is to provide a mounting and support for the steering column, supporting the same at the upper and lower sides of the gear reduction mechanism.

A further object of the invention is to provide a novel means for adjustably supporting the steering column from the vehicle.

A still further object of the invention is to provide a top plate for the gear reduction mechanism which may be adjustably secured to the vehicle frame and a base member pivotally connected to the vehicle.

Further objects, and objects relating to economies of manufacture and details of construction, will definitely appear from the detailed description to follow.

The objects of the invention are accomplished by the devices and means described in the following specification. My invention is clearly defined and pointed out in the appended claims.

A structure constituting a preferred embodiment of my invention is illustrated in the accompanying drawings forming a part of this specification, in which:

Figure I is a top plan view of the forward part of a motor vehicle frame, in which the invention is embodied.

Figure II is an enlarged, side elevational view, showing in detail the connection of the steering mechanism to the vehicle.

Figure III is a view similar to Fig. II showing a slightly modified means for connecting the steering mechanism with the vehicle.

Figure IV is a sectional view taken on the line IV—IV of Figure III showing in detail the supporting brackets for supporting the base member of the gear reduction casing.

Figure V is a perspective view of the bracket for supporting the gear reduction casing shown in Figure II.

Figure VI is a detail sectional view taken on the line VI—VI of Fig. I and shows in detail the reduction gearing at the lower end of the steering column.

Figure VII is a detail, sectional view, taken substantially on the line VII—VII of Figures II and III.

In the drawings, similar reference numerals refer to similar parts throughout the several views, and the sectional views are taken looking in the direction of the arrows at the ends of the section lines.

Considering the numbered parts of the drawings, I have shown the frame 10 of a motor vehicle having a front axle 11, on which the front steering wheels 12 are mounted, said frame 10 being supported at its front end from the axle 11 by means of the springs 13. An internal combustion engine 14 has its engine base provided with ears 15 at the corners thereof, by means of which the engine is supported from the frame, and the support at three corners of the engine base is effected through brackets 16.

At the forward left-hand corner of the engine, when a left-hand drive is desired, I provide a bracket 17 having a vertical portion 18, secured to the frame 10 by means of the rivets 19, and a horizontal portion 20 upon which the corresponding ear 15 extending from the engine base 14 is adapted to seat and is secured by means of a bolt 21.

A bracket 22 may be secured to the underside of the horizontal portion 20 of the bracket 17 by means of the bolt 21 and is pivotally connected at 23 to the base member 24 of the gear reduction casing. The casing for the gear reduction mechanism comprises a base member 24, a top member 25, and a cylindrical member 26 interposed between the base and top members 24 and 25, these members being secured in position by the bolts 24'.

The base member 24 has a downwardly extending portion 27 in which a stub shaft 28 is journaled. The stub shaft 28 has a spider 29 secured to or formed integral with one end thereof and disposed in the cup shaped recess 30 formed in the base member 24. The spider 29 is provided with openings 31 near the ends of the arms thereof, in which pins 32 are disposed as shown in Figures VI and VII of the drawings. Gears 33 are journaled on the ends of the pins 32 and mesh with an internal gear 34 formed on the inner face of the cylindrical ring 26. The top member 25, which forms with the cylindrical ring 26 and the base member 24, a housing for the gear reduction mechanism is provided with a boss or stem 35, extending in the direction of the stub shaft 28 and provided with a passage in which the shaft 36 is journaled.

The shaft 36 carries at its lower end a gear 37 which is disposed within the chamber formed by the cylindrical ring 26 meshing with the three gears 33, mounted on the pins 32. The upper end of the shaft 36 projects into the hollow lower end of the steering column 38 and is secured thereto by means of bolts 39, and by means of a clamp 40, formed by a split collar embracing the lower end of the steering column, so as to tightly clamp the steering column to the shaft 36 to prevent movement of one relative to the other, so that as said steering column is rotated the shaft 36 will be rotated with it.

The top member 25 is provided with a bracket 41 having slotted openings 41′ and an enlarged opening 41″ through which the bolts 42 may be inserted to adjustably secure the bracket 41 to the frame 10. Because of the slotted openings 41′ and the enlarged opening 41″, the steering column may be adjusted to the desired angle to bring the same into proper position to secure the same to the vehicle body.

A steering arm 43 is disposed on the lower end of the stub shaft 28 and secured thereto by means of a nut 44, threaded on the end of the shaft 28, and said arm 43 is provided at its free end with a ball 45, which is adapted to fit in a socket (not shown) secured to one end of the steering rod 46. The steering rod is connected at 47 with the rod 48, connecting the usual arms 49 by means of which the motion of the steering arm 43 is communicated to the steering wheels to turn the same.

In the modified construction as shown in Figures III and IV of the drawings, the base member is braced against movement by means of the brace 55, one end of the brace being attached to the horizontal portion 20 of the bracket 17 by means of the bolt 21, and the outer end secured to the base member of the gear reduction casing by means of the bolts 24′. As other details of the construction shown in Figures III and IV of the drawings are the same as the construction previously described a further description is deemed unnecessary.

From the description of the parts given above, the operation of the device should be very readily understood. When the steering column 38 is rotated, the shaft 36 is caused to rotate with the steering column, thus turning the gear 37 which meshes with the gears 33, which gears also mesh with the fixed internal gear 34, carried on the inner edge of the ring 26. This arrangement of planetary gearing causes the rotation of the shaft 36 to be transmitted to the stub shaft 28, which carries the spider 29 on which the gears 33 are mounted. In the transmission of said movement from one shaft to the other, the amount of movement is reduced, while the torque is increased so that a partial rotation of the steering column 38 will produce a smaller angular movement in the stub shaft 28 and the steering arm 43, but the torque exerted by the steering arm 43 will be increased correspondingly.

From the construction shown it will be observed that the arm or brace 22 is secured at one end by the bolt 21 to the horizontal portion 20 of the bracket 17 and is pivoted at its outer end to the downwardly extending portion 27 of the base member 24 of the cover for the gear reduction mechanism. This affords a simple and inexpensive means in assembly, to properly locate the steering arm 43 and ball 45 with respect to the steering rod 46. With the bolt 23 used as a pivot for locating the steering column, the bracket 41 may be properly located with respect to the frame, and because of the slotted openings 41′ in the bracket 41 which allows for this adjustment, the steering column may be brought to the desired angle and securely held in that position by means of the bolts 42.

What I claim as new and desire to secure by Letters Patent is:

1. In a steering mechanism for motor vehicles, a casing comprising a top plate adapted to be secured to the frame of the vehicle, a base member, and a cylindrical member positioned between the top plate and base member and clamped therebetween, and a reduction gearing protected by said casing, one element of said gearing being formed on said cylindrical member.

2. In a steering mechanism for motor vehicles, a casing comprising a top plate adapted to be adjustably secured to the frame of the vehicle, a base member, and a cylindrical member positioned between the top plate and base member and clamped therebetween and a reduction gearing enclosed in said casing and comprising an internal gear on said cylindrical member.

3. In a steering mechanism for motor vehicles, a casing comprising a top plate adapted to be secured to the vehicle, a cylindrical member, and a base member secured to the vehicle, and a reduction gearing enclosed in said casing, one element of said gearing being formed on said cylindrical member.

4. In a steering mechanism for motor vehicles, a reduction gearing, a casing therefor comprising a cylindrical member interposed between a top plate and base member, both of said top and base members being separately supported by the vehicle.

5. In a steering mechanism for motor vehicles, a casing for the gear reduction mechanism comprising top and base members, both of said members being separately supported by the vehicle.

6. In a steering mechanism for motor vehicles, a casing for the gear reduction mechanism, comprising top and base members, each of said members being supported by brackets which are adapted to be separately secured to the vehicle.

7. In a steering mechanism for motor vehicles, a casing for the gear reduction mechanism comprising a plurality of members, one of said members being adjustably mounted on the frame of the vehicle and another of said members being pivotally supported by the vehicle.

8. In a steering mechanism for motor vehicles, a reduction gearing comprising a cylindrical member having an internal gear, a stub shaft, a plurality of gears mounted on said stub shaft and a gear mounted on a steering column, said gear being adapted to rotate said gears mounted on said stub shaft, a casing for said gears comprising a top plate, said cylindrical member, and a base member, said top and base members being adapted to be separately secured to the frame of the vehicle.

9. In a steering mechanism for motor vehicles, a casing for the gear reduction mechanism comprising top and base members, said top member being adjustably mounted on the vehicle frame and said base member being pivotally supported by the vehicle.

10. In a device of the class described, a reduction gearing including a cylindrical member having an internal gear, a casing for said reduction gearing, comprising a top plate, said cylindrical member, and a base member, said top plate adjustably secured to the vehicle frame, and said base member being pivotally supported by the vehicle.

In testimony whereof I affix my signature.

EDWARD H. BELDEN.